Figure 3:
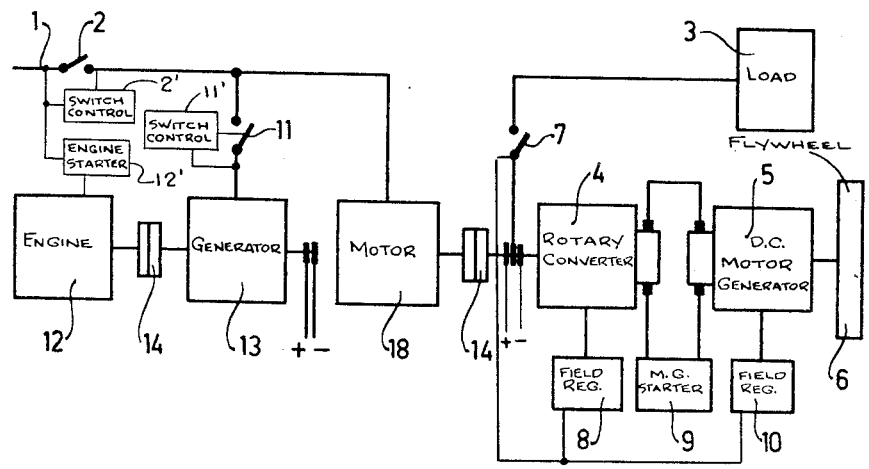

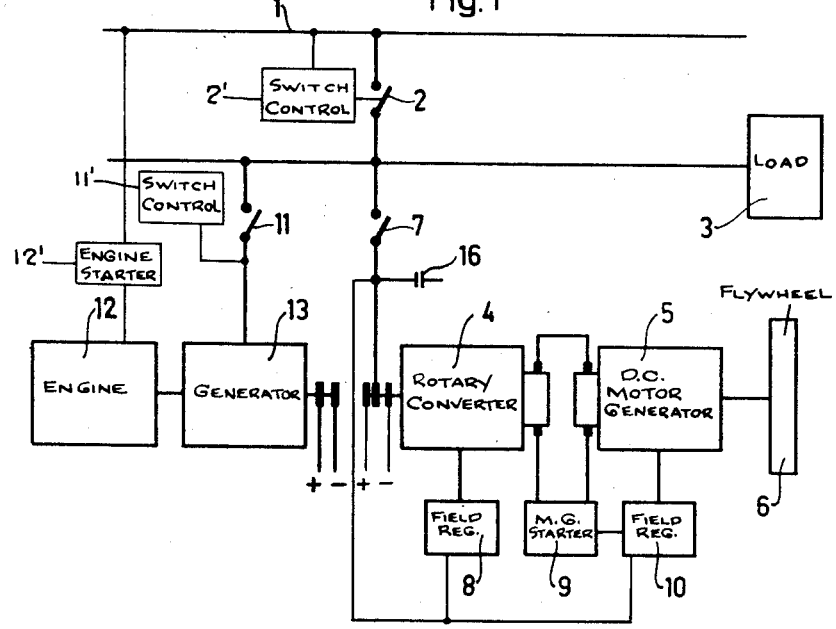
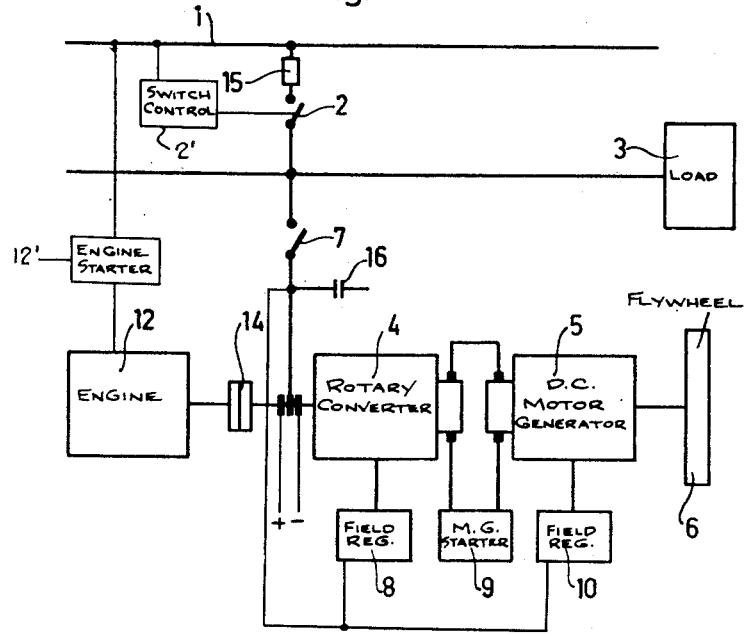

INVENTORS
PER-ERIK LINDAHL
GUNNAR ELFVING &
KARL-HENRY MATTSSON
BY
ATTORNEYS

United States Patent Office 2,783,393
Patented Feb. 26, 1957

2,783,393
APPARATUS FOR EMERGENCY POWER TRANSFER

Per-Erik Lindahl, Stockholm, Gunnar Elfving, Solna, and Karl-Henry Mattsson, Spanga, Sweden, assignors to Aktiebolaget Hagglund & Soner, Oruskoldsvik, Sweden Application November 29, 1954, Serial No. 471,847

Claims priority, application Sweden November 30, 1953

17 Claims. (Cl. 307—64)

The present invention relates to new and useful means for sustaining operation of a consumer's installation during periods of transition of supply from an alternating current distribution network to an auxiliary power plant on a failure of said network.

Consumer's installations fed from an alternating current network are frequently equipped with at least one, for instance diesel engine operated, auxiliary power plant which is arranged to be cut in automatically upon failure of the alternating current network supply. As the voltage disappears the auxiliary power plant immediately receives a starting impulse, but an interval of the order of 10 to 20 seconds will elapse before this plant will have had time to start-up and to take up the load. Particularly in tele-communication systems such stoppages cannot be tolerated and, therefore, the stoppage interval has to be bridged in some way or other. This problem has been solved in the past by the aid of converters which convert the direct current supply from a storage battery into alternating current power which is then supplied to the load until the auxiliary power plant will have had sufficient time to start up and take over. Such an auxiliary power plant, however, is costly and requires a large amount of maintenance.

It has also been proposed to employ an asynchronous machine continuously connected to the load and which in normal, i. e. uninterrupted service, operates as a motor which rotates a flywheel serving as an energy storage device. In case of a failure of the network supply this asynchronous machine will operate as a generator energized by capacitors, the kinetic energy stored in the flywheel being converted into electrical energy which is supplied to the consumer's installation. This system suffers from the disadvantage that the frequency of the alternating current delivered varies with the rotational speed of the flywheel, and that it is possible only by the aid of complicated auxiliary equipment to maintain the voltage to be supplied constant.

The present invention has for its object to improve an arrangement of the last-mentioned type in such a manner as to enable an uninterrupted, or practically uninterrupted, service to be sustained on a failure of the alternating current network supply.

For the object stated, according to the present invention, the flywheel is arranged to be operated from the alternating current network through the intermediary of an assembly comprising a converter between alternating current and direct current connected to the load and network, respectively, and a direct current machine positively connected to the flywheel and electrically interconnected with the direct current output of the converter, the direct current machine being adapted normally to operate as a motor supplied from said converter, and on a network failure to operate as a generator driven by said flywheel and supplying current to the converter, the converter, in its turn, supplying alternating current power to the load.

When utilizing a momentary auxiliary power plant devised in the manner described it will be possible, by suitably controlling the excitation of the direct current machine and the operating conditions of the converter, to arrange for the alternating current supplied to the consumer's installation by the converter to obtain a substantially stable frequency and/or voltage independently of the rotational speed of the flywheel during its running-out period.

The invention will now be described more closely in conjunction with the accompanying drawings, the Figs. 1 to 4 of which illustrate, by way of example only, four different embodiments thereof.

In the embodiment illustrated in Fig. 1, the consumer's installation or load 3 is normally connected to the alternating current network or mains 1 through a switch 2 adapted to be opened automatically by a switch control 2' on a failure occurring in the network. The usual auxiliary power plant is presumed to consist of a diesel engine 12 and a synchronous machine 13 directly coupled to the engine. The diesel engine 12 is automatically started by an engine starter 12' in the usual manner as the network 1 cuts out. Upon the diesel engine 12 reaching its normal speed the synchronous generator 13 is automatically connected, by means of a switch control 11' through the switch 11, to the load 3.

During the interval of time spent by the auxiliary power plant 12, 13 in starting and taking over the power supply the operation is sustained by the momentary auxiliary power plant according to the present invention. This plant, as illustrated in Fig. 1 of the accompanying drawings, comprises a single-armature rotary converter 4 normally connected to the supply network 1 and to the load 3, its direct current output being connected to a direct current machine 5 having mounted on its shaft a flywheel 6. For controlling the excitation of the direct current machine 5 a field regulator 10 is provided, and for changing the conditions of excitation of the rotary converter 4 a field regulator 8 is incorporated. Numeral 9 designates an automatic starter for the direct current machine 5.

The rotary converter 4 can be started from the supply network 1 in the conventional manner using a reduced voltage. When the machine has reached a synchronous speed the excitation is switched on. Then the direct current machine 5 is subjected to its full intensity excitation and is started by being connected to the rotary converter 4 by means of the automatic starter 9. Finally, the direct current machine 5 is accelerated up to its normal speed by reducing its field intensity by the aid of the regulator 10. Kinetic energy will then be stored in the flywheel 6. In normal operation the arrangement thus depicted is maintained continuously operating, frictional and other losses being covered from the network in that the rotary converter 4 supplies the required amount of direct current to the direct current machine 5 then operating as a motor.

Now, upon a failure of the supply network 1, the switch 2 opens automatically whereby the load 3 is disconnected from the network. The energy supply will instead be taken over practically immediately by the momentary auxiliary power plant 4, 5, 6. The direct current machine 5 will then operate as a generator driven by the flywheel 6, and the energy output of the direct current machine will be converted by the rotary converter 4 into alternating current energy which is supplied to the load 3. As in the course of the deceleration period of the flywheel 6 the rotational speed of the latter decreases, the excitation of the direct current machine 5 is automatically increased in such a manner as to cause the voltage of the direct current output to be maintained substantially constant, independently of the said speed of rotation. It will be possible, by suitably controlling the field regulators 10 and 8 of the direct current machine 5 and the rotary converter 4, respectively, to maintain the alternating current energy supplied by the converter to the load 3 at a constant frequency and a constant voltage during the complete running-out period of the flywheel 6. To this end, for instance, the field regulator 10 of the direct current machine is arranged to respond to the alternating current input voltage across the load 3, and the field regulator 8 of the rotary converter may be arranged to respond to the alternating current input frequency at said load, or vice versa.

If the load of the consumer's installation 3 is a predetermined fixed value, the excitation of the rotary converter may be definitely pre-set whereby the use of a separate field regulator 8 can be dispensed with. In this case it can be arranged for the field regulator 10 of the direct current machine to respond to the voltage so as to enable the latter to be maintained constant during the deceleration period of the flywheel on a failure of the supply network. If in this case as the direct current machine a direct current machine of the self-regulating type is employed, any external field regulators can be dispensed with.

It will be understood that, in the practical application, the momentary auxiliary power plant will comprise, in addition to the required field regulators, suitable well known automatic controls so as to enable the starting and acceleration as well as the transition to generator service upon failure of the network supply and the repeated acceleration when the diesel assembly 12, 13 has started and taken over, to occur fully automatically. Such automatic controls can be arranged for in any suitable well-known manner and thus need not be described here.

In the embodiment illustrated in Fig. 2 the synchronous generator of the normal auxiliary power plant has been omitted, and the rotary converter 4 is operated as a generator for a continued securing of an uninterrupted operation until the network will be able to recommence power supply. For this purpose the diesel engine 12 is adapted to be mechanically coupled to the rotary converter 4 by the aid of a magnetic clutch 14 which is thrown in when the diesel engine has reached its normal speed of rotation. Here again the auxiliary power plant is assumed to include any necessary field regulators and automatic controls. Furthermore it should be noted that the alternating current output of the converter 4 is connected in parallel with the load 3 to the alternating current network 1 through reactors or capacitors 15, and that the regulator 8 is so arranged that in normal operation the load 3 will be supplied at a constant voltage independently of any variations in the network voltage.

In the embodiment illustrated in Fig. 2 the rotary converter 4 can be started either from the network in the manner described hereinbefore, or it can be started by the diesel engine 12 and be phased-in to the network. The flywheel 6 is sped up to a suitable high rotational speed by means of the direct current machine 5. In undisturbed operation the field regulator 8 of the rotary converter 4 regulates on constant input voltage to the load 3 whilst the field regulator 10 of the direct current machine is disconnected. The diesel engine 12 is mechanically separated from the rotary converter 4 and is out of operation. On a disturbance occurring in the network the latter will immediately be disconnected from the consumer's installation 3 by the switch 2. The power supply will initially be taken over by the flywheel 6 through the direct current machine 5 and the rotary converter 4. Then, as before, the field regulator 8 of the rotary converter 4 will regulate on constant voltage, and the field regulator 10 of the direct current machine 5 will regulate on constant frequency. As soon as the diesel engine 12, after having received the starting impulse, has attained its normal speed of rotation the magnetic clutch 14 will be energized at the same time as the field regulator 10 of the direct current machine 5 will be disconnected, whereby the diesel engine 12 will take over the power supply. In this operation the field regulator 8 of the rotary converter 4 will continue to regulate on constant voltage. The acceleration of the flywheel 6 to its original high speed will then commence and will be effected in accordance with a predetermined and suitably made-up program. As the operating voltage across the mains 1 reappears the network is again connected in through the closure of the switch 2, the magnetic clutch 14 is de-energized and the diesel engine 12 is stopped.

It will be observed that the units incorporated in the auxiliary power plant according to the present invention are standard type machines. The installation illustrated in Fig. 1 has two machines, that one illustrated in Fig. 2, however, only one machine additional to the components of a normal auxiliary power plant without any momentary auxiliary power equipment. The direct current machine included in the momentary auxiliary power plant can be selected of comparatively small size since the same can be subjected to very heavy overloading during the short period in which it has to operate as a generator driven by the flywheel 6. In comparatively small installations the flywheel does not need to be journaled separately but may be mounted directly on the shaft of the direct current machine. The conversion of the kinetic energy of the flywheel into electrical alternating current energy is effected at a high efficiency owing to the property of the rotary converter to form an "auto-transformer" between the direct current and alternating current sides.

In the embodiment of the invention illustrated in Figure 2, the machine power is minimized by utilizing the rotary converter 4 both as a generator driven by the diesel engine 12 or any other auxiliary prime mover, and as a converter between alternating current and direct current.

In order to enable the rotary converter to be started without current shocks it would be suitable to design its stator winding as a normal star-connected 3-phase winding. This enables the machine to be started in the manner of a normal slip-ring induction motor. When the machine has reached its normal speed the stator will be energized by direct current supplied across two of the terminals of the star-connected winding, the third terminal being connected to the neutral point. In this way the stator winding will be utilized as a starting winding, as an excitation winding and as a damping winding. In this case the automatic controls and the field regulating equipment will, of course, have to be adapted to the particular changed conditions.

Since the efficiency of a rotary converter is a maximum for $\cos \varphi = 1$ it might be suitable, in a manner well known per se, to compensate the demand of the load 3 for reactive power from a capacitor battery 16 shown in Figures 1 and 2.

In the arrangements described hereinbefore, on a failure of the voltage across the supplying mains, if the impedance of the supply network is low, or on a short-circuiting of the supplying mains, a brief interval of time will elapse before the switch 2 will have had time to break, and during this interval the input voltage to the consumer's installation or load 3 is zero. This time interval is only of the order of 20 to 50 milliseconds, and such short an interruption of the input voltage would, as a rule, be tolerable. If the rotary converter 4 together with the interruption sensitive load 3 are connected to the supplying network 1 through a reactance in the form of an inductance or capacitors 15, as indicated in Fig. 2, the input voltage to the load 3 will not decrease to zero during said interval, but only to a definite positive value the magnitude of which will depend on the size of the reactors or capacitors and on the dynamic properties of the rotary converter. By suitably dimensioning the installation it will thus be possible to maintain the drop of the input voltage to the load 3 within fairly reasonable limits.

However, in certain cases an absolutely undisturbed operation without any change in the voltage and frequency at the consumer's installation or load 3 is required. This result can be obtained by modifying the installation shown in Fig. 1 or Fig. 2 in the manner illustrated in Figs. 3 and 4.

According to these figures the rotary converter 4 is arranged to be operated in normal operation from the alternating current network 1 through a motor 18 connected to this network, preferably a squirrel cage induction motor, while the consumer's equipment 3 is connected solely to the alternating current output of the converter. This involves the result that the rotary converter 4 will supply the load 3 with alternating current already in undisturbed operation, and at the same time it will supply direct current to the direct current machine 5 operating as a motor. On a failure of the alternating current network the converter will supply the load 3 exclusively while absorbing power from the direct current machine 5 then driven from the flywheel and operating as a generator. In the embodiment illustrated in Fig. 3 the usual auxiliary power plant consists of a diesel engine 12 or other auxiliary motor, and a generator 13 driven thereby which, after the diesel engine has started on a failure of the alternating current network and has attained its normal speed, is connected by the switch 11 to the asynchronous machine 18. In the embodiment of Fig. 4 the synchronous generator 13 and the switch 11 are omitted in that the diesel engine 12 is connectible directly to the rotary converter 4, for instance, as shown, by a magnetic clutch 14 through the shaft of the asynchronous machine 18. Instead of the induction motor 18 a reaction motor or other machine may be employed the rotational speed of which will not be decreased by disturbances liable to occur in the alternating supplying network 1.

Figure 4:
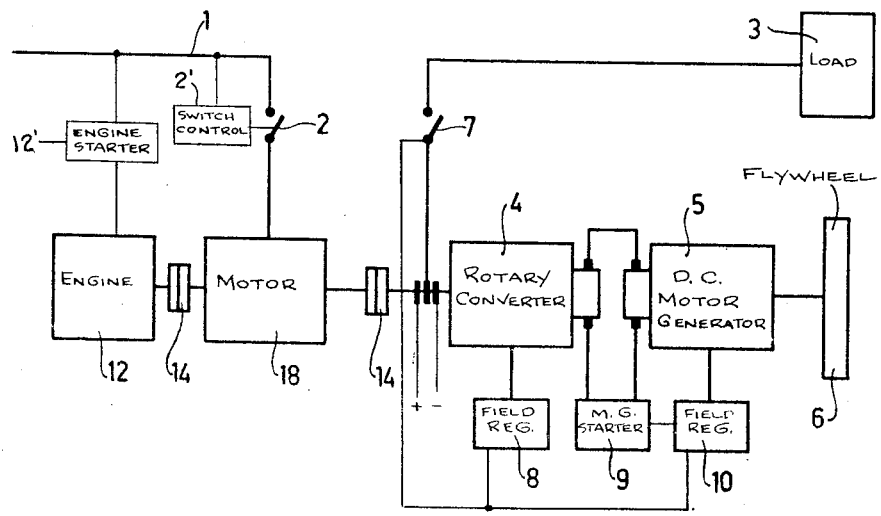

In the embodiments illustrated in Figs. 3 and 4 an absolutely undisturbed operation of the interruption sensitive load 3 will be obtained. Furthermore, by using an asynchronous machine as the driving motor for the rotary converter the starting will be simplified.

In the embodiments described hereinbefore the converter 4 between direct current and alternating current has been assumed to consist of a rotary converter. However, there is nothing to prevent the employment of other kinds of rotating conversion assemblies, such as a motor-generator or a motor converter, even though in such cases the regulation problems will be more difficultly solved. In the embodiment of Fig. 1 it would even be possible to use, as a converter between direct current and alternating current, a mercury arc converter or other stationary converter provided that the load 3 contains synchronous machines. However, as a rule it would be the most suitable to employ a single-armature rotary converter owing to the low cost of procuring the same, to its high efficiency of operation, and to its capacity of being used for regulation of the voltage at the consumer's installation or load also in normal operation, in co-operation with reactors or capacitors inserted between the alternating current network and the rotary converter.

We claim:

1. Apparatus for sustaining operation of a consumer's load during periods of transition of supply from a distributing alternating current network to an auxiliary power plant on a failure of said network, said apparatus comprising a flywheel and means powered from said alternating current network for rotating said flywheel and for converting the kinetic energy in said flywheel into alternating current power upon failure of the network, said means including a converter connected to the network and a direct current machine connected between the converter and the flywheel, the direct current machine being adapted to normally operate as a motor supplied from the converter for driving the flywheel and upon network failure to operate as a generator driven by said flywheel for supplying direct current to said converter, the converter in turn supplying alternating current to the consumer's load.

2. Apparatus in accordance with claim 1 including means for controlling the converter output to maintain said output at a substantially constant frequency.

3. Apparatus in accordance with claim 1 in which the converter is a rotating type of converter.

4. Apparatus in accordance with claim 1 adapted for use when the consumer's load is constant including means for controlling the output of the machine when it is operating as a generator to maintain said output at a substantially constant voltage independently of its rotational speed.

5. Apparatus in accordance with claim 1 including a separate regulator associated with the machine and regulating the excitation of the machine.

6. Apparatus in accordance with claim 1 adapted for use when the consumer's load is constant including means for controlling the output of the machine when it is operating as a generator to maintain said output as a substantially constant voltage independently of its rotational speed and in which the converter is a single-armature rotary converter and in which there is provided a regulator for the machine responsive to the voltage at the consumer's load.

7. Apparatus in accordance with claim 1 including a separate field regulator associated with the machine and regulating the excitation of the machine and in which the field regulator of the machine is connected to respond to the frequency of the alternating current voltage output from the converter.

8. Apparatus in accordance with claim 1 in which the converter is a rotating type of converter and includes a regulator adapted to control the condition of excitation of the converter.

9. Apparatus in accordance with claim 1 in which the converter is a rotating type of converter and includes a field regulator adapted to control the condition of excitation of the field of the converter.

10. Apparatus in accordance with claim 1 in which the converter is a rotating type of converter and includes a field regulator responsive to the voltage at the load and adapted to control the condition of excitation of the field of the converter.

11. Apparatus in accordance with claim 1 in which the alternating current side of the converter is connected in parallel with the load to the network through a reactance.

12. Apparatus in accordance with claim 1 in which the alternating current side of the converter is connected in parallel with the load to the network through a reactance and in which a regulator is arranged to cause the load to receive in normal operation a constant voltage independent of variations in network voltage.

13. Apparatus in accordance with claim 1 in which the converter is a single-armature rotary converter and in which the stator winding of the converter is a star-connected 3-phase winding adapted to be excited by a direct current supplied across two of the terminals of the stator winding and adapted to have the third terminal connected to a neutral point, the arrangement providing a stator winding useable for starting, excitation and as a damping winding.

14. Apparatus in accordance with claim 1 in which the converter is a rotating type of converter, and including a motor connected to said network for driving said converter and in which the load is connected exclusively to the converter whereby the converter supplies power to the customer's load and to the direct current machine operating as a flywheel driving motor.

15. Apparatus in accordance with claim 1 in which the converter is a rotating type of converter, and including a motor connected to said network for driving said converter and in which the load is connected exclusively to the converter whereby the converter supplies power to the customer's load and to the direct current machine operating as a flywheel driving motor, the apparatus also including an auxiliary prime mover and means responsive to failure of the alternating current network for connecting said prime mover to drive said motor.

16. Apparatus in accordance with claim 1 in which the converter is a rotating type of converter, and including a motor connected to said network for driving said converter and in which the load is connected exclusively to the converter whereby the converter supplies power to the customer's load and to the direct current machine operating as a flywheel driving motor, the apparatus also including an auxiliary prime mover and an auxiliary generator and means responsive to failure of the alternating current network for connecting said prime mover to drive said motor through said auxiliary generator.

17. Apparatus in accordance with claim 1 in which the converter is a rotating type of converter, and including a motor connected to said network for driving said converter and in which the load is connected exclusively to the converter whereby the converter supplies power to the customer's load and to the direct current machine operating as a flywheel driving motor, the apparatus also including an auxiliary prime mover and clutch means responsive to failure of the alternating current network for connecting said prime mover to drive said motor.

References Cited in the file of this patent
UNITED STATES PATENTS

| | | |
|---|---|---|
| 1,965,371 | Drabelle | July 3, 1934 |
| 2,302,192 | Dannheiser | Nov. 17, 1942 |